A. F. HAMMOND.
CHIN SUPPORT.
APPLICATION FILED APR. 15, 1911.
1,000,907.
Patented Aug. 15, 1911.
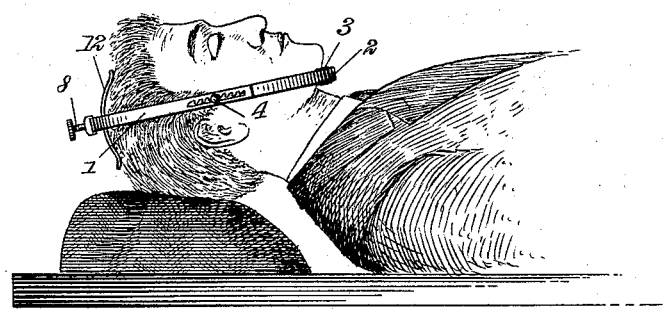
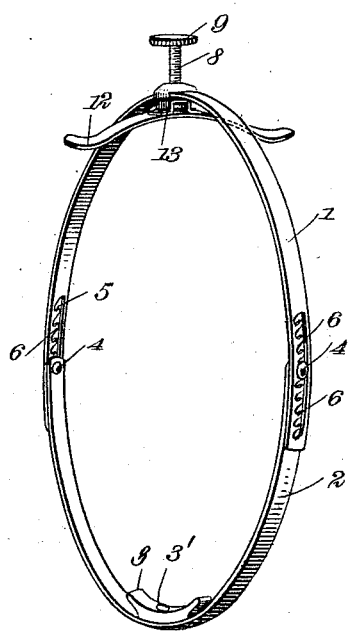
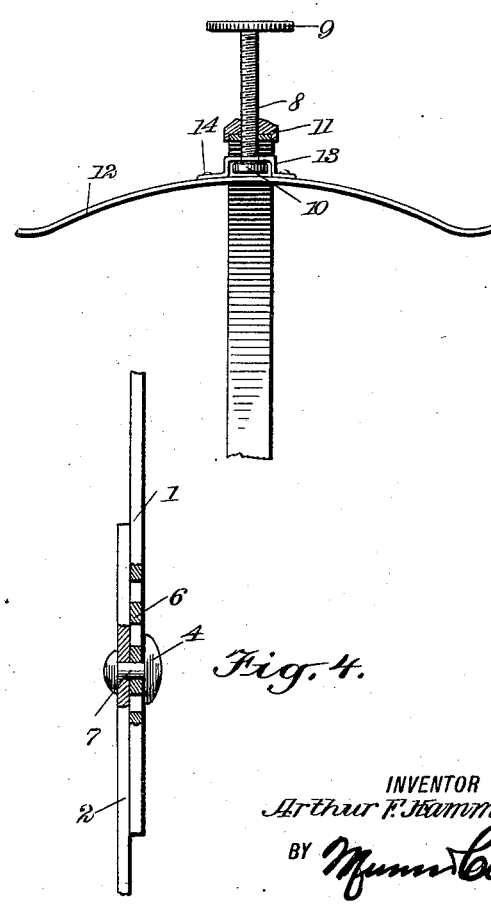
WITNESSES:
INVENTOR
Arthur F. Hammond
BY
ATTORNEYS

UNITED STATES PATENT OFFICE.

ARTHUR FAYETTE HAMMOND, OF NORTH PLATTE, NEBRASKA.

CHIN-SUPPORT.

1,000,907. Specification of Letters Patent. Patented Aug. 15, 1911.

Application filed April 15, 1911. Serial No. 621,216.

*To all whom it may concern:*

Be it known that I, ARTHUR F. HAMMOND, a citizen of the United States, and a resident of North Platte, in the county of Lincoln and State of Nebraska, have invented a new and Improved Chin-Support, of which the following is a full, clear, and exact description.

My invention relates generally to implements used by undertakers and more particularly to a device adapted to bring the jaws into proper relation with each other when laying out a body.

The object of my invention is to provide a chin rest especially adapted to hold the jaws in such position that in the event of the body being laid out having false teeth the said teeth will be prevented from slipping.

A further object of my invention is to provide an adjustable chin rest having a head band thereon which may be easily adjusted to different heads and which will be efficient in its purpose, that is, to prevent the slipping of false teeth before rigor-mortis sets in.

A further object of my invention is to provide a device of this class which will consist of few parts so related to each other that they may be easily adjusted, and which, when once adjusted, will not slip out of position.

Reference is to be had to the accompanying drawings forming a part of this specification, in which like characters of reference denote corresponding parts in all the views, and in which—

Figure 1 is a side view of my rest in use; Fig. 2 is a perspective view thereof; Fig. 3 is a partial vertical sectional view; Fig. 4 is a partial sectional view showing particularly the adjustable means carried at the sides of the rest.

My device is preferably of curved construction, and the main portion thereof consists of two members 1, 2, the lower of which is provided with a bearing member 3 adapted to bear against the chin, the two members being each provided at opposite portions with adjustable connecting means comprising a pin 4 carried by one of the members and a slot 5 provided in the other member. One side wall of the slot 5 is so shaped in order to form a plurality of projecting teeth 6, the distance between each pair of teeth being sufficient to engage the shank portion 7 of the pin 4, this pin being provided at opposite ends with an enlarged head portion, as shown in Fig. 4. The width of the slot between the plane side wall thereof and the outer edges of the teeth 6 is sufficient to permit free movement of the shank portion 7 therein. The bearing member 3 is rotatably mounted on the lower member 2 so that the upper curved portion of this bearing member may be used in the position shown in Figs. 1 and 2, or it may be turned 90° thereto, whereby it will extend transversely to the plane of the member 2.

The member 1 at its upper portion is provided with a threaded opening in which the screw member 8, having a knurled head 9 and a lower bearing end 10, is movably engaged and in order to provide an effective connection, an auxiliary bearing member 11 is provided through which the member 8 passes. A head band 12, curved longitudinally and preferably of the shape shown in Fig. 3, is provided at its central portion with a strap 13 having an opening therein in which the end of the member 8 freely moves, the bearing end 10 of this member being in engagement with the under face of the strap whereby these parts are held together; any suitable means, such as screws or rivets 14, may be used to hold this strap in position on the band 12.

My device may be quickly and easily adjusted in use by bringing the bearing member 3 into position against the chin and the head band adjacent the top of the head, the two parts 1 and 2 being moved relatively to each other by simply pressing these parts between each other. After the device has been placed in position it may be firmly held there and slipping prevented by giving a few turns to the thumb screw 8 which will bring the outer ends of the head band 12 into firm position on the head, thereby preventing movement of the rest. It is to be noted that three bearing points are provided, the one adjacent the chin and the two on the top of the head so that there is a straight pull upward against the jaw and in the case of false teeth the teeth will be firmly held in position and prevented from slipping out of place before rigor-mortis sets in.

While I have shown a single form of adjusting means between the parts 1 and 2 and a particular form of head band, it is obvious that changes may be made in the form, shape, and size, without departing from the spirit of the invention, as set forth in the following claims.

Having thus described my invention, I claim as new, and desire to secure by Letters Patent:—

1. A device of the class described, comprising two curved members in adjustable engagement, the end portions of one member being each provided with a transversely extending pin, the end portions of the other member being each provided with a longitudinally extending slot, one wall of each of the slots being provided with teeth, whereby the curved members may be held in different positions of adjustment by the engagement of the pins with any of the said teeth, the intermediate portions of one of the members being provided with an adjustable and transversely extending head band, the intermediate portion of the other member being provided with a rotatably mounted bearing member adapted to engage with the chin.

2. A device of the class described, comprising two curved members, in removable engagement with each other, each end portion of one member being provided with a transversely extending pin, each end portion of the other member being provided with a longitudinally extending slot, one wall of each of the slots being provided with teeth whereby the curved members may be held in different positions of adjustment by the engagement of the pins with any of the said teeth, the intermediate portion of one of the members being provided with a transversely extending head band, the said head band being provided with a screw engaging in a threaded opening in the said member whereby the head band may be moved toward and away from the said member, the intermediate portion of the other member being provided with a rotatably mounted bearing member for engagement with the chin.

In testimony whereof I have signed my name to this specification in the presence of two subscribing witnesses.

ARTHUR FAYETTE HAMMOND.

Witnesses:
  GEORGE E. PROSSER,
  KATHERINE F. CLARK.

---

Copies of this patent may be obtained for five cents each, by addressing the "Commissioner of Patents, Washington, D. C."